United States Patent
Natarajan et al.

(10) Patent No.: US 11,875,427 B2
(45) Date of Patent: Jan. 16, 2024

(54) GUARANTEED REAL-TIME CACHE CARVEOUT FOR DISPLAYED IMAGE PROCESSING SYSTEMS AND METHODS

(71) Applicant: Apple Inc., Cupertino, CA (US)

(72) Inventors: Rohit Natarajan, Sunnyvale, CA (US); Christopher P. Tann, San Jose, CA (US); Rohit K. Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 17/473,754

(22) Filed: Sep. 13, 2021

(65) Prior Publication Data
US 2023/0081746 A1    Mar. 16, 2023

(51) Int. Cl.
*G06T 1/60* (2006.01)
*G06F 12/0895* (2016.01)
*G06F 12/0873* (2016.01)
*G06T 1/20* (2006.01)

(52) U.S. Cl.
CPC ............ *G06T 1/60* (2013.01); *G06F 12/0873* (2013.01); *G06F 12/0895* (2013.01); *G06T 1/20* (2013.01); *G06F 2212/1024* (2013.01); *G06F 2212/401* (2013.01); *G06F 2212/455* (2013.01)

(58) Field of Classification Search
CPC ......... G06T 1/20; G06T 1/60; G06F 12/0873; G06F 12/0895; G06F 2212/1024; G06F 2212/401; G06F 2212/455
USPC .................................................. 345/531, 557
See application file for complete search history.

(56) References Cited

U.S. PATENT DOCUMENTS

| | | | |
|---|---|---|---|
| 2002/0184445 A1* | 12/2002 | Cherabuddi | G06F 12/084 711/130 |
| 2005/0030313 A1* | 2/2005 | Radke | G09G 5/393 345/532 |
| 2016/0125269 A1 | 5/2016 | Lee et al. | |
| 2018/0350296 A1* | 12/2018 | Thompson | G06F 3/0673 |
| 2019/0340123 A1* | 11/2019 | Herdrich | G06F 12/1483 |
| 2020/0074583 A1* | 3/2020 | Holland | G06F 12/1081 |
| 2020/0228810 A1 | 7/2020 | Batard | |
| 2021/0183333 A1* | 6/2021 | Holland | G09G 3/3208 |

OTHER PUBLICATIONS

Peng, Chao, "Real-time Visualization of Massive 3D Models on GPU Parallel Architectures," Virginia Polytechnic Institute and State University, Apr. 2013, 125 pgs.

* cited by examiner

*Primary Examiner* — Jacinta M Crawford
(74) *Attorney, Agent, or Firm* — Fletcher Yoder P.C.

(57) ABSTRACT

An electronic device may include an electronic display to display an image based on processed image data. The electronic device may also include image processing circuitry to generate the processed image data based on input image data and previously determined data stored in memory. The image processing circuitry may also operate according to real-time computing constraints. Cache memory may store the previously determined data in a provisioned section of the cache memory allotted to the image processing circuitry. Additionally, a controller may manage reading and writing of the previously determined data to the provisioned section of the cache memory.

21 Claims, 7 Drawing Sheets

GUARANTEED REAL-TIME CACHE CARVEOUT FOR DISPLAYED IMAGE PROCESSING SYSTEMS AND METHODS

BACKGROUND

The present disclosure relates generally to displayed image processing and, more particularly, to a guaranteed real-time cache carveout to be utilized by image processing circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data.

The images to be displayed may be represented by image data defining luminance values for pixels of the display. In general, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, and/or other factors that may cause distortions or artifacts perceivable to a viewer. In some instances, compensation circuitry may utilize parameters, mappings, historical values, or other information stored in memory when compensating the image data. However, bandwidth issues may arise when ensuring available memory for the stored information.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some scenarios, image processing circuitry may utilize one or more parameters, mappings, historical values, or other information previously determined and stored in memory when compensating image data for display. For example, pixel drive compensation (PDC) circuitry may recall the luminance values output to each pixel in one or more previous frames. Additionally or alternatively, burn-in compensation (BIC) circuitry may store and reference a burn-in history map with associated ages of each pixel or pixel groups of the display. However, in some scenarios, bandwidth issues may arise when ensuring available memory/bandwidth for information used by the image processing circuitry in real-time, such as the PDC circuitry and the BIC circuitry. Such issues may be exacerbated as the refresh rate and/or increased pixel resolution (e.g., number and/or density of pixels) increases, which may increase memory demand and bandwidth utilization.

In some embodiments, a portion of the memory (e.g., cache, random access memory (RAM), or other non-transitory storage media) may be carved out and allotted to certain portions of the image processing circuitry to reduce or eliminate bandwidth and/or memory related problems/glitches. For example, to satisfy the requirements of a real-time virtual channel the RAM (e.g., dynamic RAM (DRAM) or static RAM (SRAM)) may include one or more sections of provisioned RAM, dedicated for one or more particular operations (e.g., image processing operations). However, when provisioning for multiple real-time agents (e.g., image processing circuitry or other processing operations), the bandwidth and/or available RAM may be insufficient to guarantee real-time processing for each real-time agent.

In some embodiments, cache memory may supplement or supplant the provisioned RAM by utilizing a portion of the cache memory for cache as static RAM (SRAM). In general, cache memory is regarded as opportunistic such that available memory is allotted on a first-come-first-served basis. However, a guaranteed real-time (GRT) virtual channel may be implemented by a controller for allocating portions of the cache memory to real-time agents. For example, a portion of the cache as SRAM may be allotted as PDC provisioned cache or BIC provisioned cache. As such, the RAM and/or cache memory may be used for real-time memory operations.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
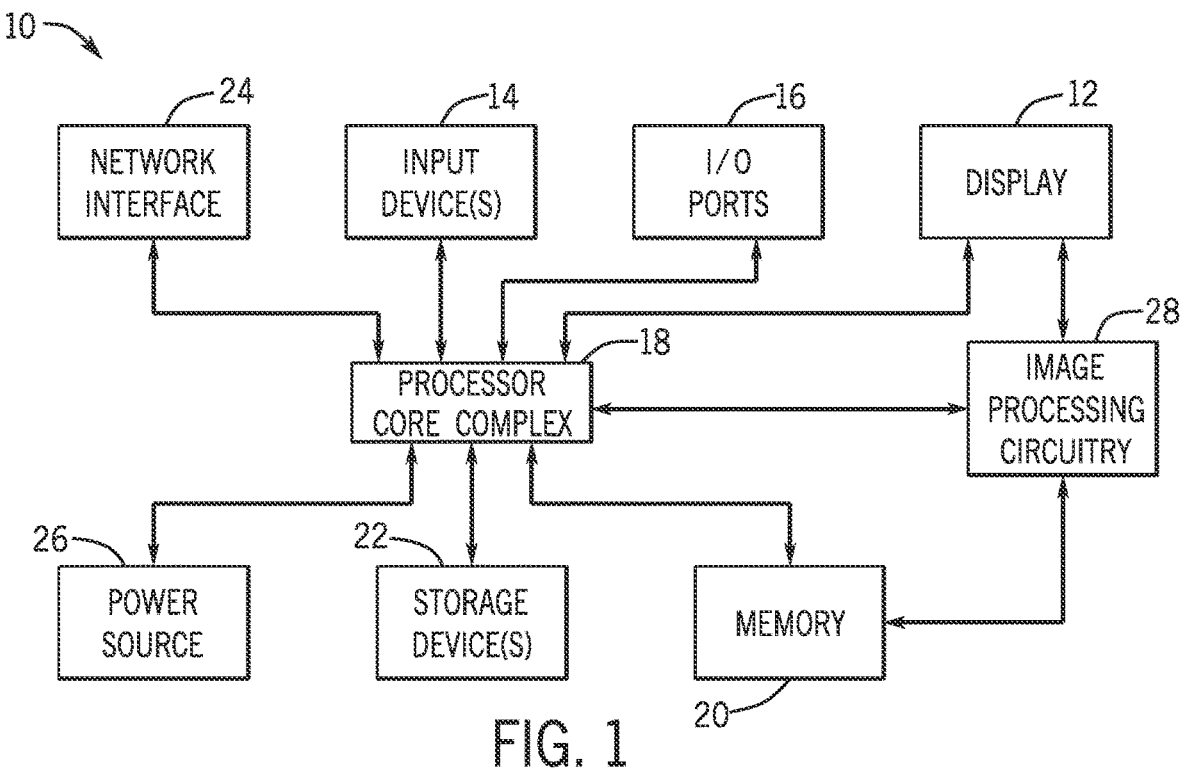
FIG. 1 is a block diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. An electronic display may take the form of a liquid crystal display (LCD), a light emitting diode (LED) display, an organic light emitting diode (OLED) display, a plasma display, or the like.

To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luma values.

In some scenarios, the image to be displayed may, if unaltered, include image artifacts when perceived by a viewer. For example, artifacts could be due to environmental effects such as temperature, pixel aging, electrical cross-talk between electrodes, transitions from previous luminance values, image processing warps such as shifts and scaling, and/or other distorting factors. As such, the image data may be compensated to reduce or eliminate perceivable artifacts. For example, image processing circuitry may include a pixel drive compensation (PDC) block and a burn-in compensation (BIC) block. As will be discussed further below, the PDC block may provide compensation for transient response variations when transitioning a pixel value from a previous luminance level to a current luminance level. Additionally, the BIC block may track pixel usage (e.g., over a given period and/or throughout the life of the display) to estimate an aging of the pixel and provide compensation for age related variations in pixel responses. In some embodiments, the image processing circuitry may operate in real-time. As used herein, "real-time" refers to computing in which calculations are guaranteed within a time window to ensure proper operation. For example, certain image processing compensations may utilize real-time computing (RTC) to be guaranteed by a deadline to ensure the image frame may be displayed to the user on time.

The image processing circuitry may utilize one or more parameters, mappings, historical values, or other information stored in memory when compensating the image data. For example, the PDC block may recall the luminance values output to each pixel in one or more previous frames. Additionally or alternatively, the BIC block may store and reference a burn-in history map with associated ages of each pixel or pixel groups of the display. However, in some scenarios, bandwidth issues may arise when ensuring available memory for information used by the image processing circuitry in real-time, such as the PDC block and the BIC block. Such issues may be exacerbated as the refresh rate and/or increased pixel resolution (e.g., number and/or density of pixels) increases, which may increase memory demand and bandwidth utilization.

In some embodiments, a portion of the memory (e.g., cache, random access memory (RAM), or other non-transitory storage media) may be carved out and allotted to certain portions of the image processing circuitry to reduce or eliminate bandwidth and/or memory related problems/glitches. For example, a portion of the cache memory may be implemented as an extension of or substitute for the RAM. The cache as RAM (e.g., cache as static RAM) may guarantee real-time availability and bandwidth for image processing blocks operating on real-time deadlines.

One embodiment of an electronic device 10 that utilizes a guaranteed real-time (GRT) virtual channel accessing cache as RAM is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Additionally, the image processing circuitry 28 (e.g., a graphics processing unit, a display image processing pipeline, etc.) may be included in the processor core complex 18.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include cache memory or random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18 and/or the image processing circuitry 28. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
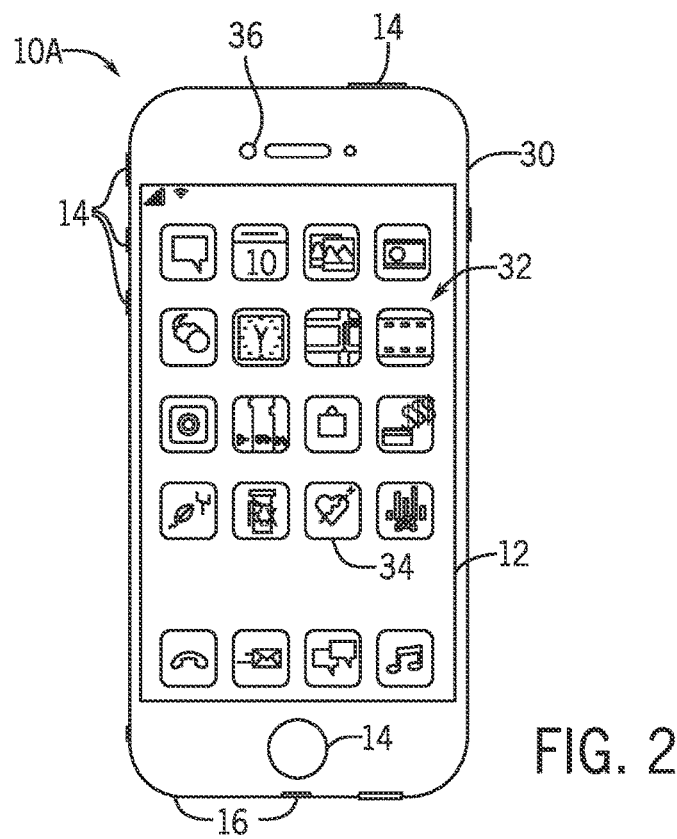
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as an iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
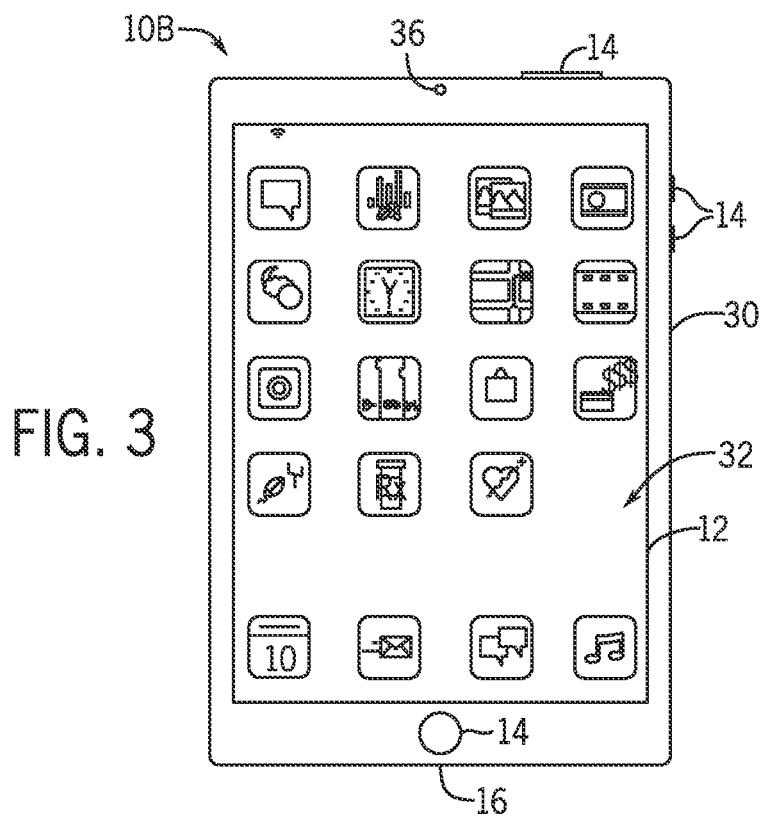
FIG. 3 is another example of the electronic device of FIG. 1 in the form of a tablet device, in accordance with an embodiment.
Figure 4:
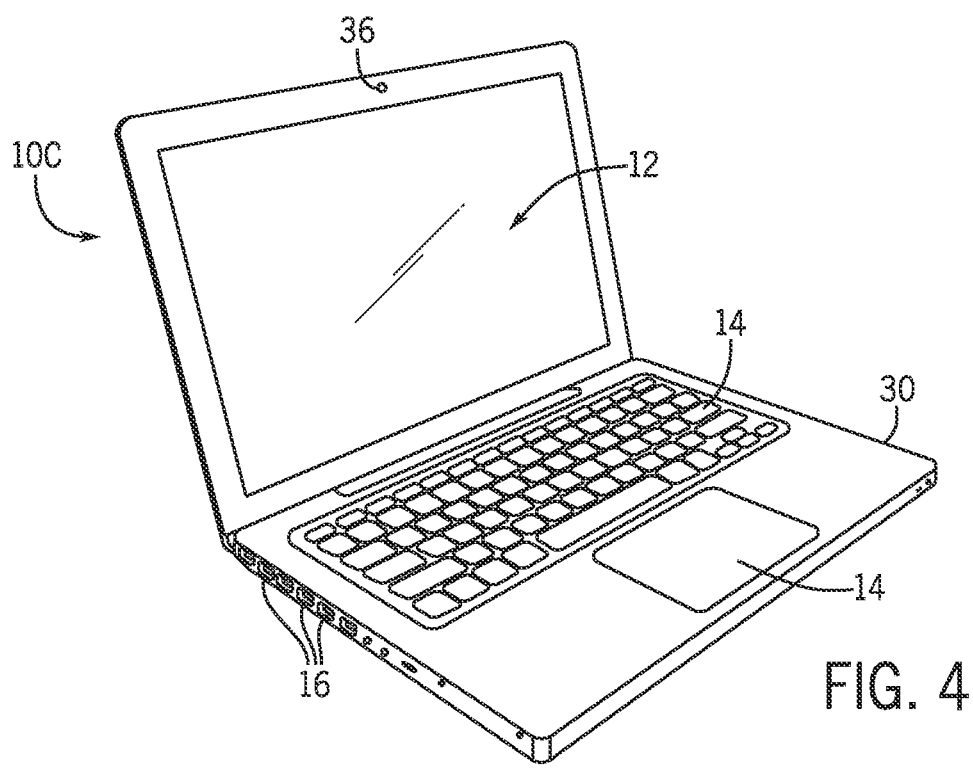
FIG. 4 is another example of the electronic device of FIG. 1 in the form of a computer, in accordance with an embodiment.
Figure 5:
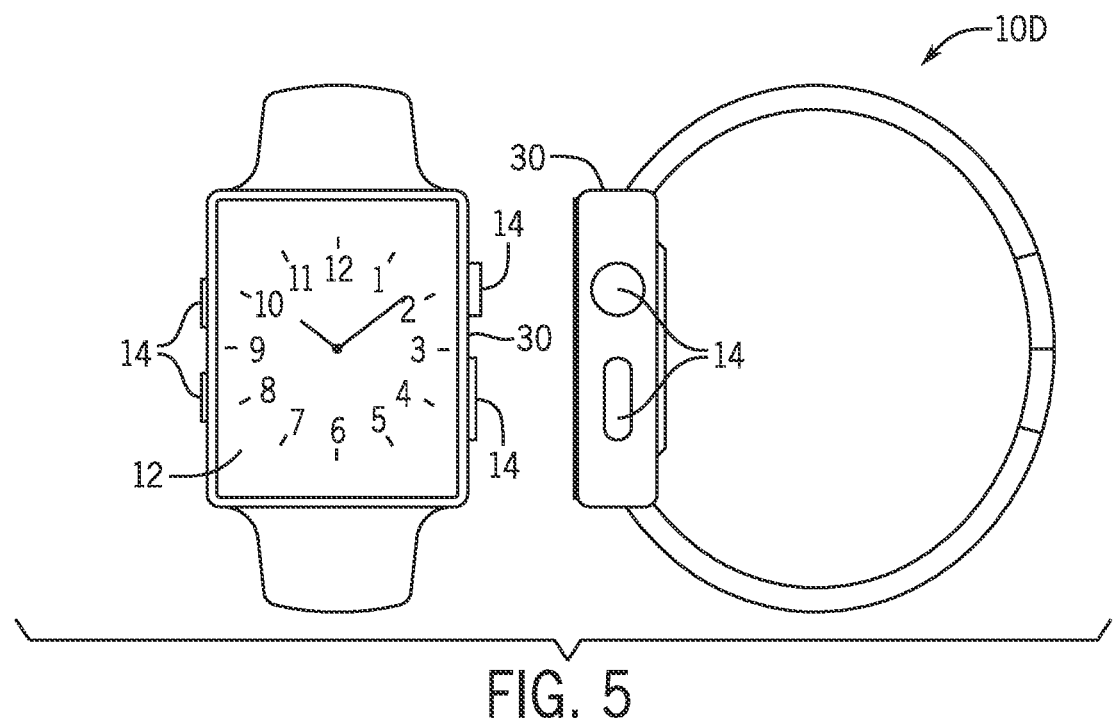
FIG. 5 is another example of the electronic device of FIG. 1 in the form of a watch, in accordance with an embodiment.

Another example of a suitable electronic device 10, specifically a tablet device 10B, is shown in FIG. 3. For illustrative purposes, the tablet device 10B may be an iPad® model available from Apple Inc. A further example of a suitable electronic device 10, specifically a computer 10C, is shown in FIG. 4. For illustrative purposes, the computer 10C may be a MacBook® or iMac® model available from Apple Inc. Another example of a suitable electronic device 10, specifically a watch 10D, is shown in FIG. 5. For illustrative purposes, the watch 10D may be an Apple Watch® model available from Apple Inc. As depicted, the tablet device 10B, the computer 10C, and the watch 10D each also includes an electronic display 12, input devices 14, I/O ports 16, and an enclosure 30.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 6:
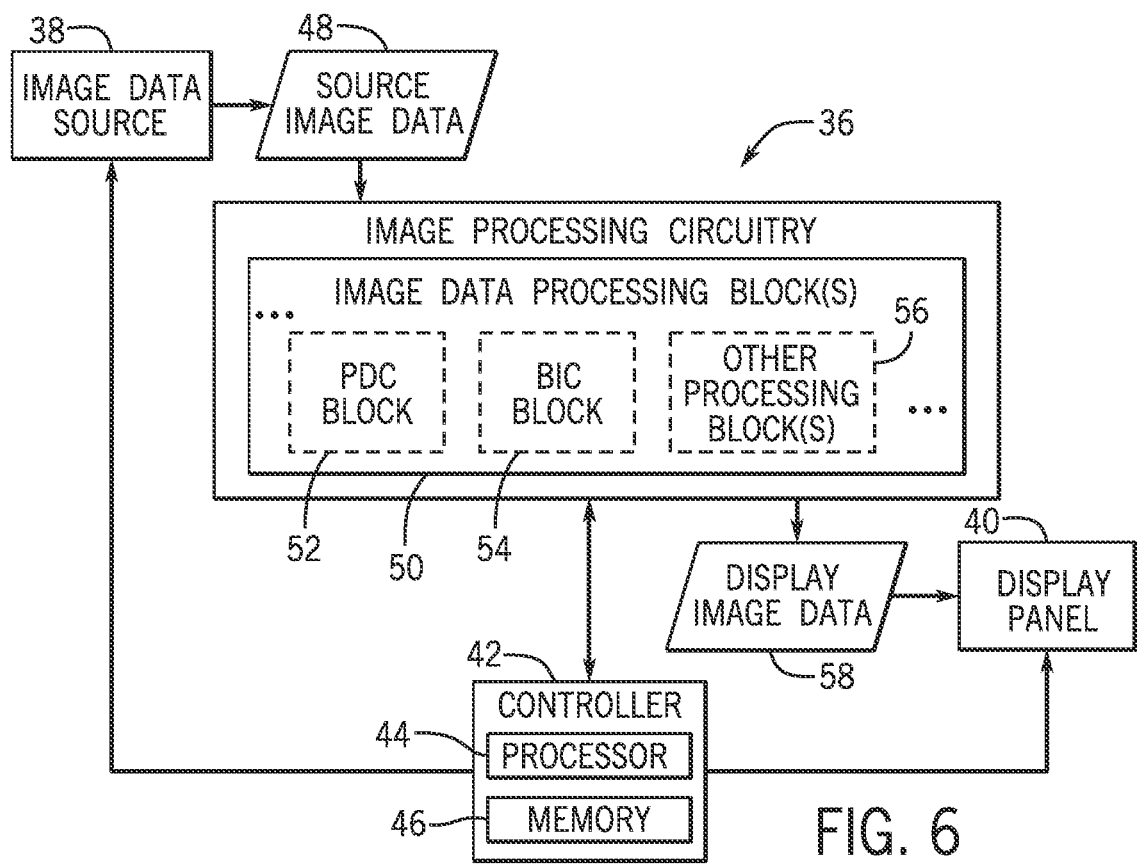
FIG. 6 is a block diagram of a display pipeline of the electronic device of FIG. 1 including a pixel drive compensation (PDC) block and a burn-in compensation (BIC) block, in accordance with an embodiment.

To help illustrate, a portion of the electronic device 10, including image processing circuitry 28, is shown in FIG. 6. In some embodiments, the image processing circuitry 28 may be implemented by circuitry in the electronic device 10, circuitry in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a liquid crystal display (LCD), a light emitting diode (LED) display, an organic LED (OLED) display, or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an 8-bit fixed point αRGB format, a 10-bit fixed point αRGB format, a signed 16-bit floating point αRGB format, an 8-bit fixed point YCbCr format, a 10-bit fixed point YCbCr format, a 12-bit fixed point YCbCr format, and/or the like. In some embodiments, the image data source 38 may be included in the processor core complex 18, the image processing circuitry 28, or a combination thereof. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. The image processing circuitry 28 may include one or more sets of image data processing blocks 50 (e.g., circuitry, modules, or processing stages) such as a pixel drive compensation (PDC) block 52 and/or a burn-in compensation (BIC) block 54. As should be appreciated, multiple other processing blocks 56 may also be incorporated into the image processing circuitry 28, such as a color management block, a dither block, a scaling/rotation block, etc. The image data processing blocks 50 may receive and process source image data 48 and output display image data 58 in a format (e.g., digital format and/or resolution) interpretable by the display panel 40. Further, the functions (e.g., operations) performed by the image processing circuitry 28 may be divided between various image data processing blocks 50, and while the term "block" is used herein, there may or may not be a logical separation between the image data processing blocks 50.

In some embodiments, the PDC block 52 may process image data to compensate for display pixel non-uniformity, such as transient response variations. A transient response variation may arise when a pixel emits a first amount of light during one frame and a different amount of light in a second frame. In some instances, transient response variations may affect electrical energy stored in a display pixel and, thus, actual (e.g., perceived) luminance, which may manifest as perceivable artifacts, such as edge-ghosting (e.g., edge shadow), spatial stretching and/or compression, color fringing, color shift, and/or the like. As such, the PDC block 52 may reduce or eliminate visual artifacts that could arise due to a transient response by compensating image data by an amount that causes the pixel in the display panel 40 to properly emit the targeted amount of light in the second frame.

Figure 7:
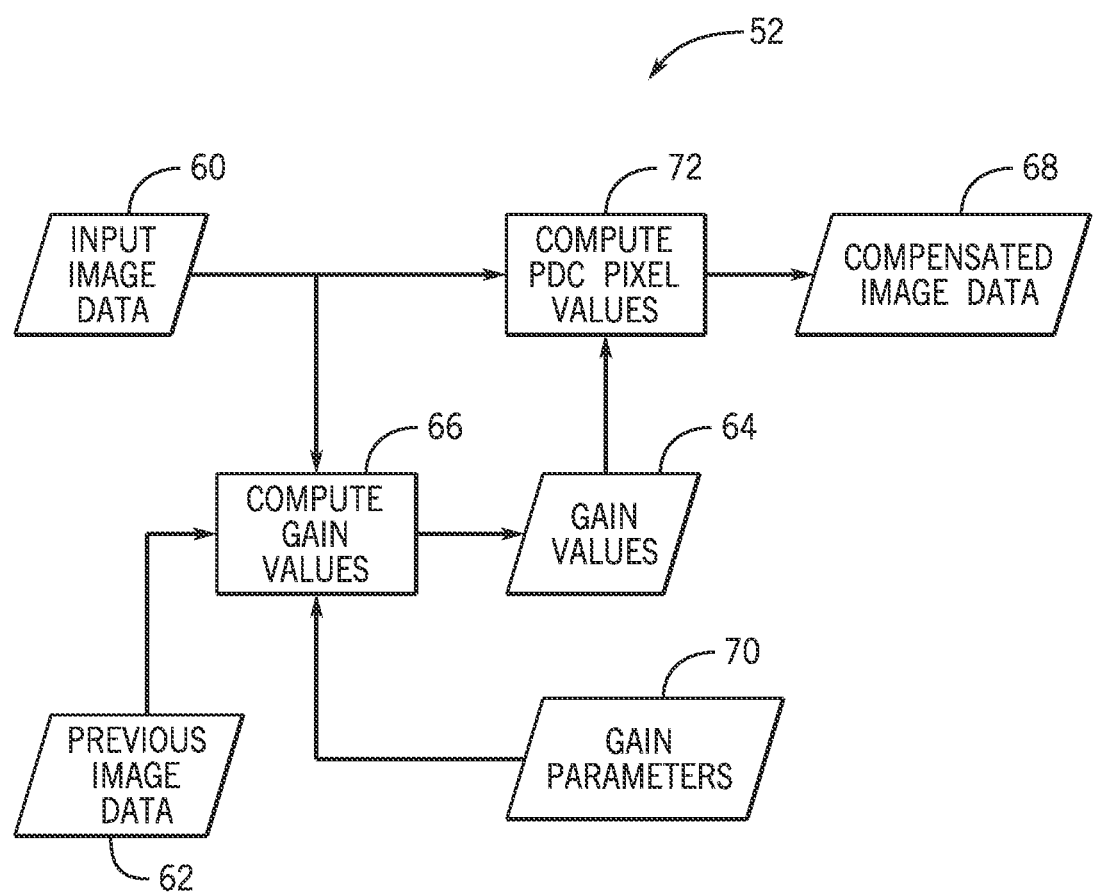
FIG. 7 is a block diagram of the PDC block of FIG. 6, in accordance with an embodiment.

In general, the PDC block 52 may utilize input image data 60 and previous image data 62 to compute gain values 64, for example, via a compute PDC pixel values sub-block 72, as shown in FIG. 7. As used herein, the input image data 60 may be representative of the source image data 48 for a currently processing image frame to be subsequently displayed via the display panel 40. Moreover, the input image data 60 may be unaltered source image data 48 or processed, at least in part, by one or more image data processing blocks 50. For example, the compensated image data 68 of the PDC block 52 may be the input image data 60 of the BIC block 54 or other processing block(s) 56 or vice versa. Additionally, the previous image data 62 may be representative of display image data 58 sent to the display panel 40 for one or more image frames directly previous to the currently processing image frame.

In some embodiments, the compute gain values sub-block 66 may also utilize gain parameter 70 along with the input image data 60 and the previous image data 62 to compute the gain values 64. For example, the gain parameters 70 may include an offset map (e.g., lookup table (LUT)) indicating a gain to be applied based on the input image data 60 and the previous image data 62. In some embodiments, the gain parameters 70 may also include scenario specific parameters such as based on environmental conditions (e.g., temperature), current settings (e.g., a global brightness or emission duty cycle), or an operating mode of the electronic device 10 or display panel 40. The gain values 64 may be applied to the input image data 60, for example, via a compute PDC pixel values sub-block 72 to generate the compensated image data 68.

Figure 8:
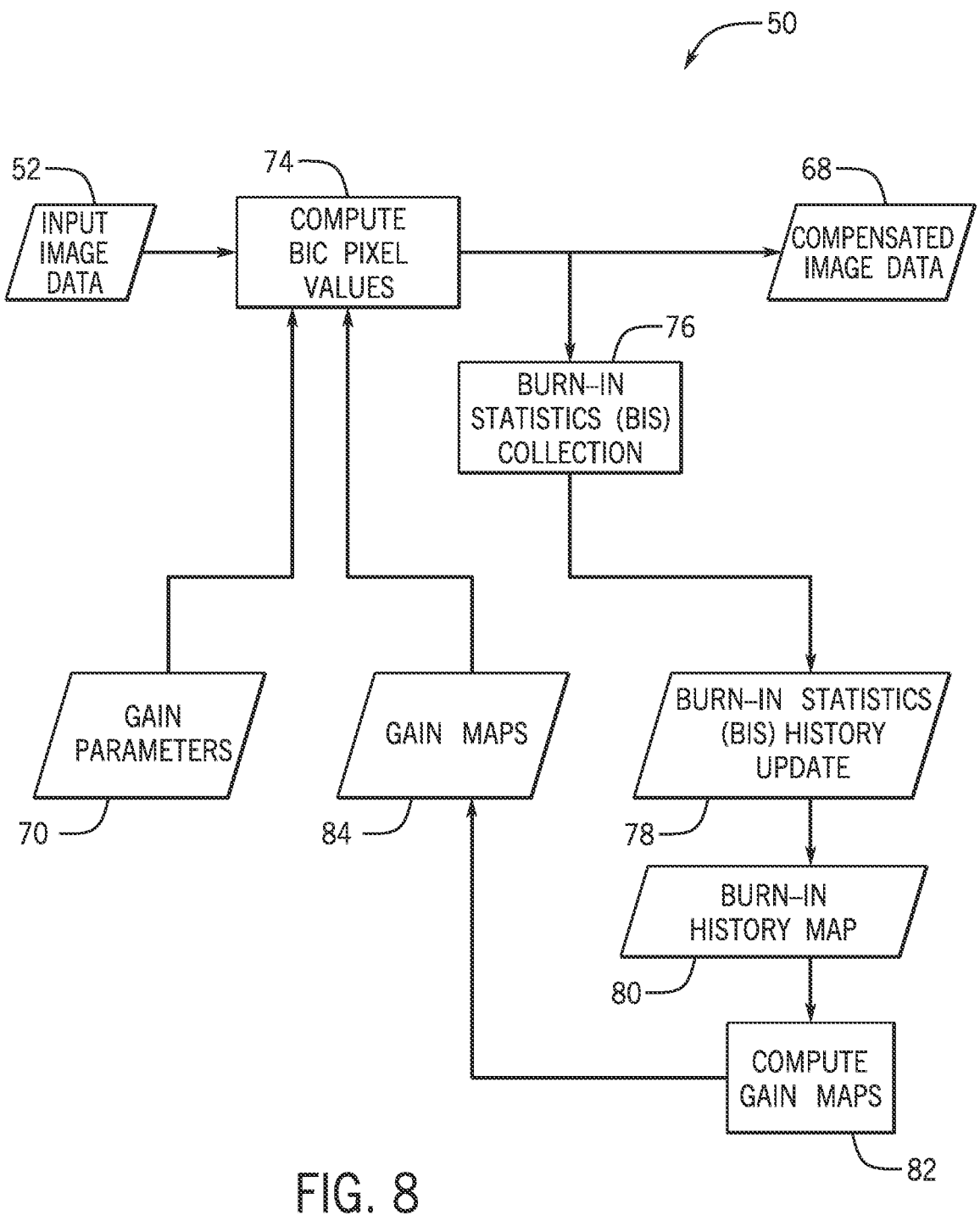
FIG. 8 is a block diagram of the BIC block of FIG. 6, in accordance with an embodiment.

Additionally or alternatively to the PDC block 52, the image data processing blocks 50 may include the BIC block 54 to compensate image data for burn-in related aging of pixels of the display panel 40. For example, the BIC block 54 may encompass a compute BIC pixel values sub-block 74 and a burn-in statistics (BIS) collection sub-block 76, as shown in FIG. 8. The compute BIC pixel values sub-block 74 may receive the input image data 60 and output the compensated image data 68 adjusted for non-uniform pixel aging of the electronic display 12. Additionally, the BIS collection sub-block 76 may analyze all or a portion of the compensated image data 68 to generate a BIS history update 78 (i.e., an incremental update) representing an increased amount of pixel aging that is estimated to have occurred since a corresponding previous BIS history update 78. In some embodiments, a burn-in history map 80 may be maintained as a cumulative mapping of the estimated burn-in related aging of the display panel 40. While discussed above as utilizing the compensated image data 68 to generate the BIS history update 78, as should be appreciated, it is the compensated image data 68 of previous image frames that form the burn-in history map 80 used in the current image frame. Furthermore, in some embodiments the BIS collection sub-block 76 may utilize the display image data 58 (e.g., post processing) to generate the BIS history update 78, for example, if the compensated image data 68 is to be further processed by other processing blocks 56.

Additionally, the BIC block 54 may use the burn-in history map 80 in a compute gain maps sub-block 82 to generate gain maps 84 for compensating the input image data 60. In some embodiments, the gain maps 84 may be two-dimensional (2D) maps of per-color-component pixel gains. For example, the gain maps 84 may be programmed into 2D lookup tables (LUTs) in the display pipeline for use by the compute BIC pixel values sub-block 74.

In some embodiments, the compute BIC pixel values sub-block 74 may utilize gain parameters 70 to account for dynamic and/or global (e.g., affecting the entire, majority, or preset portions of display pixels) factors such as brightness settings, normalizations, etc. As should be appreciated, the gain parameters 70 are non-limiting and additional parameters may also be included in determining the compensated image data 68 such as floating or fixed reference values and/or parameters representative of the type of display panel 40. As such, the gain parameters 70 may represent any suitable parameters that the compute BIC pixel values sub-block 74 may use to appropriately adjust the values of and/or apply the gain maps 84 to compensate for burn-in. Furthermore, gain parameters 70 may be shared amongst multiple image data processing blocks 50 or each image data processing block 50 may have independent gain parameters 70.

As should be appreciated, the schematic diagrams of FIGS. 7 and 8 are given for illustrative purposes and are non-limiting. For example, one or more of the sub-blocks (e.g., the compute gain values sub-block 66 and the compute PDC pixel values sub-block 72) may be combined as a single stage or split into further stages. Additionally, while discussed above as gain values 64 and gain maps 84 to be applied to the input image data 60 any suitable alteration such as offsets, gains, or formulaic compensation may be applied to the input image data 60 to generate the compensated image data 68.

As discussed herein, some image data processing blocks 50 or other components of the electronic device 10 may be operated in real-time, having bandwidth requirements to be satisfied within a given amount of time. For example, the PDC block 52 and BIC block 54 may have time constraints on storing and/or retrieving data such as the previous image data 62 and the burn-in history map 80 used in their respective compensations. As such, a real-time virtual memory channel may be employed to access and store information in memory 20, 22, or 46.

Figure 9:
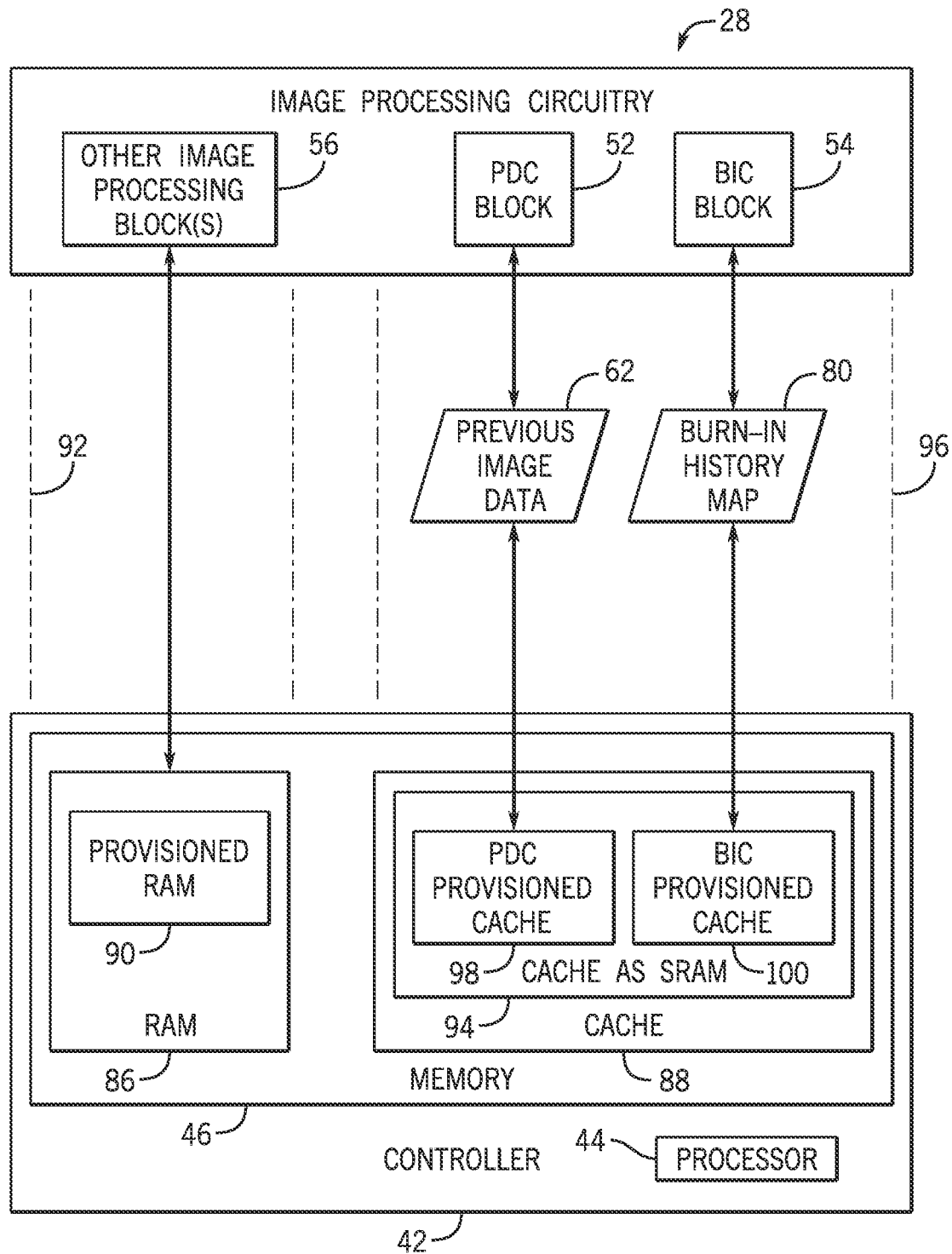
FIG. 9 is a block diagram of image processing blocks accessing real-time provisioned memory, in accordance with an embodiment.

As discussed above, a controller 42 may govern, at least in part, operation of the image processing circuitry 28. For example, the controller 42 may include controller memory 46 for storing and accessing data used by the image processing circuitry 28. Moreover, the controller 42 may also utilize the controller processor 44 to regulate the controller memory 46 allocation and utilization. In some embodiments, the controller memory 46 may include random access memory (RAM) 86 and cache memory 88, as illustrated in FIG. 9. In general, to satisfy the requirements of a real-time virtual channel the RAM 86 (e.g., dynamic RAM (DRAM) or static RAM (SRAM)) may include one or more sections of provisioned RAM 90, dedicated for one or more particular operations (e.g., image processing operations). For example, the controller processor 44 may allocate a section of provisioned RAM 90 and associated bandwidth to a real-time virtual channel 92 for whichever agent (e.g., image data processing block 50 or other processing operation) is utilizing that real-time virtual channel 92. However, when provisioning for multiple real-time agents, the bandwidth and/or available RAM 86 of the controller 42 may be insufficient to guarantee real-time processing for each real-time agent.

In some embodiments, cache memory 88 may supplement or supplant the provisioned RAM 90 by utilizing a portion of the cache memory 88 for cache as static RAM (SRAM) 94. In general, cache memory 88 is regarded as opportunistic such that available memory is allotted on a first-come-first-served basis. However, a guaranteed real-time (GRT) virtual channel 96 may be implemented by the controller 42 for allocating portions of the cache memory 88 to real-time agents. For example, a portion of the cache as SRAM 94 may be allotted as PDC provisioned cache 98 or BIC provisioned cache 100. As such, the RAM 86 and/or cache memory 88 may be used for real-time memory operations.

In some embodiments, the cache as SRAM 94 may be assigned memory addresses as if it were an extension of the RAM 86. In other words, a defined address range may be assigned to the cache as SRAM 94. Moreover, to differentiate between the different physical locations of the RAM 86 and cache 88, a portion of the starting address may signify to the controller 42 where to send the read/write request. For example, if the starting address for a memory request is within the assigned address range of the cache as SRAM 94, the transaction is passed to the GRT virtual channel 96 to access the cache as SRAM 94, otherwise the transaction is passed to a real-time virtual channel 92 to access the RAM 86 or provisioned RAM 90. Additionally or alternatively, the controller 42 may direct an agent to either the RAM 86 or the cache as SRAM 94 via the real-time virtual channel 92 or the GRT virtual channel 96, respectively, based on an operating mode of the electronic device 10. For example, a low power mode or certain display modes (e.g., always-on-display mode vs. normal operation) may disable/enable certain portions of the electronic device 10 including the RAM 86 or the cache 88. As such, in some embodiments, the operating mode may override the starting address identifying a particular memory location (e.g., RAM 86 or cache as SRAM 94).

In some embodiments, certain agents, such as the PDC block 52 and/or the BIC block 54 may specify memory addresses in the cache as SRAM 94 (e.g., the PDC provisioned cache 98 and/or the BIC provisioned cache 100) in order to access data (e.g., the previous image data 62 and/or the burn-in history map 80) via the GRT virtual channel 96. Additionally or alternatively, the controller 42 may recognize transactions (e.g., read/write requests) from agents designated as operating under real-time conditions and automatically direct the agents to the GRT virtual channel 96.

In addition to providing the GRT virtual channel 96 with GRT memory and bandwidth availability, utilizing cache as SRAM 94 may provide power savings over the provisioned RAM 90. For example, a read/write of data stored in cache 88 may draw less power than an equivalent read/write in RAM 86. In some scenarios, the data stored in the cache as SRAM 94 may be written and/or read by the same agent over and over. For example, the BIC block 54 may utilize the burn-in history map 80 during each frame to generate the burn-in compensated image data 68. As such, the repeated reading of the burn-in history map 80 may draw less power when stored in the cache as SRAM 94 (e.g., the BIC provisioned cache 100) than in provisioned RAM 90.

When allocating the cache as SRAM 94 for a particular agent (e.g., the PDC block 52 and/or the BIC block 54) it may be beneficial to provision the minimum amount of cache as SRAM 94 to preserve the cache memory 88 for other uses. For example, in the case of the PDC block 52, the previous image data 62, corresponding to the pixel values of the previous image frame, may be the same size for each frame. As such, for data with a known footprint size, the provisioning may be accomplished such that no memory or minimal memory is allocated but not used. Furthermore, depending on the processing speeds and timing constraints of the electronic device 10, the data stored in the cache as SRAM 94 may be compressed to further save space. For example, in some embodiments, the burn-in history map 80 may be updated periodically (e.g., once per frame, once per hundred frames, once per hour, once per day, etc.). As such, a compressed version of the updated burn-in history map 80 may be generated and, when bandwidth is available, may be stored in the cache as SRAM 94 while the previous burn-in history map 80 is being utilized by the BIC block 54. Moreover, when the updated burn-in history map 80 is stored in the BIC provisioned cache 100, the old burn-in history map 80 may be deleted and the memory space deallocated. As should be appreciated, any suitable data stored in the cache as SRAM 94 may be compressed regardless of how often the data is updated. Furthermore, while depicted as including the previous image data 62 and the burn-in history map 80, the data transmitted via the GRT virtual channel 96 and stored in the cache as SRAM 94 may include any suitable data for the transacting agent (e.g., image data processing block 50). Furthermore, although the PDC block 52 and BIC block 54 are discussed herein as utilizing the GRT virtual channel 96 to access cache as SRAM 94, such image data processing blocks 50 are given as non-limiting examples, and embodiments may include different image data processing blocks 50 and/or other real-time computing operations separate from image processing that utilize the cache as SRAM 94.

Figure 10:
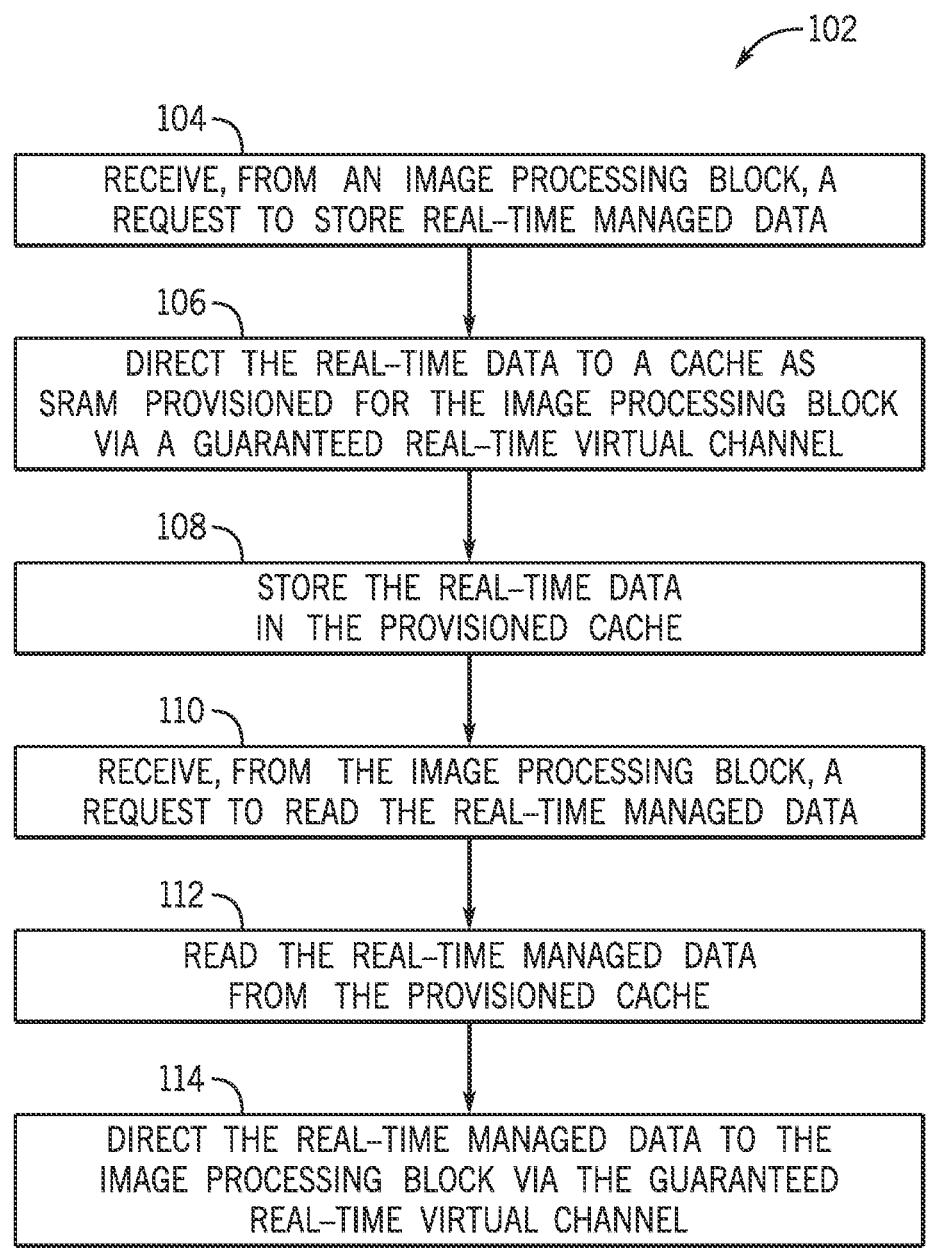
FIG. 10 is a flowchart of an example process for utilizing a guaranteed real-time virtual channel and cache as static random access memory, in accordance with an embodiment.

FIG. 10 is a flowchart of an example process 102 for utilizing the GRT virtual channel 96 and cache as SRAM 94. For example, the controller 42 may receive, from an image data processing block 50, a request to store real-time managed data (process block 104). The controller 42 may then direct the real-time data to a portion of the cache as SRAM 94 provisioned for the image data processing block 50 via a GRT virtual channel 96 (process block 106) and store the real-time data in the provisioned cache (process block 108). Additionally, in response to receiving, from the image data processing block 50, a request to read the real-time managed data (process block 110), the controller 42 may read the real-time managed data from the provisioned cache (process block 112) and direct the real-time managed data to the image data processing block 50 via the GRT virtual channel 96 (process block 114).

Although the above referenced flowchart is shown in a given order, in certain embodiments, process/decision blocks may be reordered, altered, deleted, and/or occur simultaneously. Additionally, the referenced flowchart is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
an electronic display configured to display an image based at least in part on processed image data;
image processing circuitry configured to generate the processed image data based at least in part on input image data and previously determined data stored in memory, the image processing circuitry comprising a plurality of dedicated hardware circuitry blocks configured to perform respective changes to the input image data based on the previously determined data, and wherein the image processing circuitry is configured operate according to real-time computing constraints;
cache memory configured to store the previously determined data in a provisioned section of the cache memory allotted to the image processing circuitry, wherein different dedicated hardware circuitry blocks of the plurality of dedicated hardware circuitry blocks are associated with separately provisioned portions of the provisioned section of the cache memory; and
a controller configured to manage reading and writing of the previously determined data to the provisioned section of the cache memory according to the real-time computing constraints.

2. The electronic device of claim 1, wherein a dedicated hardware circuitry block of the plurality of dedicated hardware circuitry blocks comprises pixel drive compensation circuitry configured to compensate the input image data for transient response variations, wherein the provisioned section of the cache memory comprises pixel drive compensation provisioned cache.

3. The electronic device of claim 2, wherein the previously determined data comprises previously displayed image data.

4. The electronic device of claim 1, comprising dynamic random access memory configured to provide real-time managed data to the image processing circuitry, wherein the cache memory is configured to supplement the dynamic random access memory.

5. The electronic device of claim 4, wherein the controller is configured to direct a request for accessing the previously determined data to one of the random access memory and the provisioned section of the cache memory based at least in part on a starting memory address of the request.

6. The electronic device of claim 5, wherein the controller is configured to override the direction of the request to the one of the random access memory and the provisioned section of the cache memory based at least in part on the starting memory address of the request and direct the request to the random access memory based at least in part on an operating mode of the electronic display.

7. The electronic device of claim 1, wherein a dedicated hardware circuitry block of the plurality of dedicated hardware circuitry blocks comprises burn-in compensation circuitry, wherein the provisioned section of the cache memory comprises burn-in compensation provisioned cache.

8. The electronic device of claim 7, wherein the previously determined data comprises a burn-in history map.

9. The electronic device of claim 1, wherein the cache memory comprises a non-provisioned section configured to operate on a first-come-first-served basis.

10. The electronic device of claim 1, wherein the controller is configured to manage allocation of the provisioned section of the cache memory.

11. The electronic device of claim 10, wherein the controller is configured to allocate a second provisioned section of the cache memory and manage writing an updated version of the previously determined data to the second provisioned section of the cache memory before deallocating the provisioned section of the cache memory.

12. A tangible, non-transitory, machine-readable medium comprising instructions that, when executed by processing circuitry, causes the processing circuitry to perform operations comprising:
   receiving a request to store data associated with image data compensation of image processing circuitry of an electronic device, wherein the request comprises real-time bandwidth and storage parameters;
   allocating a section of a cache memory as static random access memory;
   provisioning a subsection of the section of the cache memory allocated as static random access memory for the image processing circuitry;
   in response to the electronic device operating in a first mode, storing the data associated with the image data compensation in the subsection of the section of the cache memory allocated as static random access memory and provisioned for the image processing circuitry;
   in response to the electronic device operating in a second mode different from the first mode, provisioning a portion of a dynamic random access memory to store the data associated with the image data compensation; and
   governing access to the data associated with the image data compensation according to the real-time bandwidth and storage parameters.

13. The tangible, non-transitory, machine-readable medium of claim 12, wherein the real-time bandwidth and storage parameters comprises a footprint size of the data associated with the image data compensation and a real-time computing time constraint.

14. The tangible, non-transitory, machine-readable medium of claim 12, wherein the operations comprise:
   receiving a read request comprising a starting memory address; and
   in response to receiving the read request, determining which of the dynamic random access memory and the section of the cache memory allocated as static random access memory to direct the read request based at least in part on the starting memory address.

15. The tangible, non-transitory, machine-readable medium of claim 14, wherein the operations comprise:
   in response to determining to direct the read request to the dynamic random access memory, directing the read request to the dynamic random access memory via a first real-time virtual channel; and
   in response to determining to direct the read request to the section of the cache memory allocated as static random access memory, directing the read request to the section of the cache memory allocated as static random access memory via a second real-time virtual channel.

16. An electronic device comprising:
   an electronic display configured to display an image based at least in part on processed image data;
   image processing circuitry comprising first compensation circuitry and burn-in compensation circuitry configured to generate burn-in compensated image data, wherein the image processing circuitry is configured to generate the processed image data based at least in part on the burn-in compensated image data, wherein the burn-in compensation circuitry is configured to generate the burn-in compensated image data based at least in part on input image data and a burn-in history map stored in memory, wherein the burn-in compensation circuitry is configured operate according to one or more time constraints;
   dynamic random access memory configured to store data associated with the first compensation circuitry;
   cache memory comprising a first section of cache configured to operate opportunistically and a second section of cache configured to operate as static random access memory; and
   a controller configured to provision a subsection of the second section of cache for the burn-in history map and to manage reading or writing of the burn-in history map, to the subsection of the second section of cache, in accordance with the one or more time constraints.

17. The image processing circuitry of claim 16, wherein the image processing circuitry comprises pixel drive compensation circuitry configured to generate pixel drive compensated image data, wherein the image processing circuitry is configured to generate the processed image data based at least in part on the pixel drive compensated image data, wherein the pixel drive compensation circuitry is configured to generate the pixel drive compensated image data based at least in part on the input image data and previous image data stored in the memory, wherein the pixel drive compensation circuitry is configured operate according to one or more second time constraints, and wherein the controller is configured to provision a second subsection of the second section of cache for the previous image data and to manage reading or writing of the previous image data, to the second subsection of the second section of cache, in accordance with the one or more second time constraints.

18. The image processing circuitry of claim 16, wherein the controller is configured to provision a portion of the dynamic random access memory to store the burn-in history map and deallocate the subsection of the second section of cache in response to a change in operating mode of the electronic display.

19. The image processing circuitry of claim 16, wherein the controller is configured to direct a read request to one of the dynamic random access memory and the second section of cache, based at least in part on a starting memory address of the read request.

20. The image processing circuitry of claim 16, wherein the burn-in history map is compressed prior to storage in the subsection of the second section of cache.

21. An electronic device comprising:
- an electronic display configured to display an image based at least in part on processed image data;
- image processing circuitry configured to generate the processed image data based at least in part on input image data and previously determined data stored in memory, the image processing circuitry comprising a plurality of dedicated hardware circuitry blocks configured to perform respective changes to the input image data based on the previously determined data, and wherein the image processing circuitry is configured operate according to real-time computing constraints;
- random access memory configured to store a first portion of the previously determined data operatively used by a first hardware circuitry block of the plurality of dedicated hardware circuitry blocks;
- cache memory configured to store a second portion of the previously determined data in a provisioned section of the cache memory operatively used by a second hardware circuitry block of the plurality of dedicated hardware circuitry blocks; and
- a controller configured to manage reading and writing of the previously determined data to the provisioned section of the cache memory according to the real-time computing constraints.

* * * * *